Figure 1:
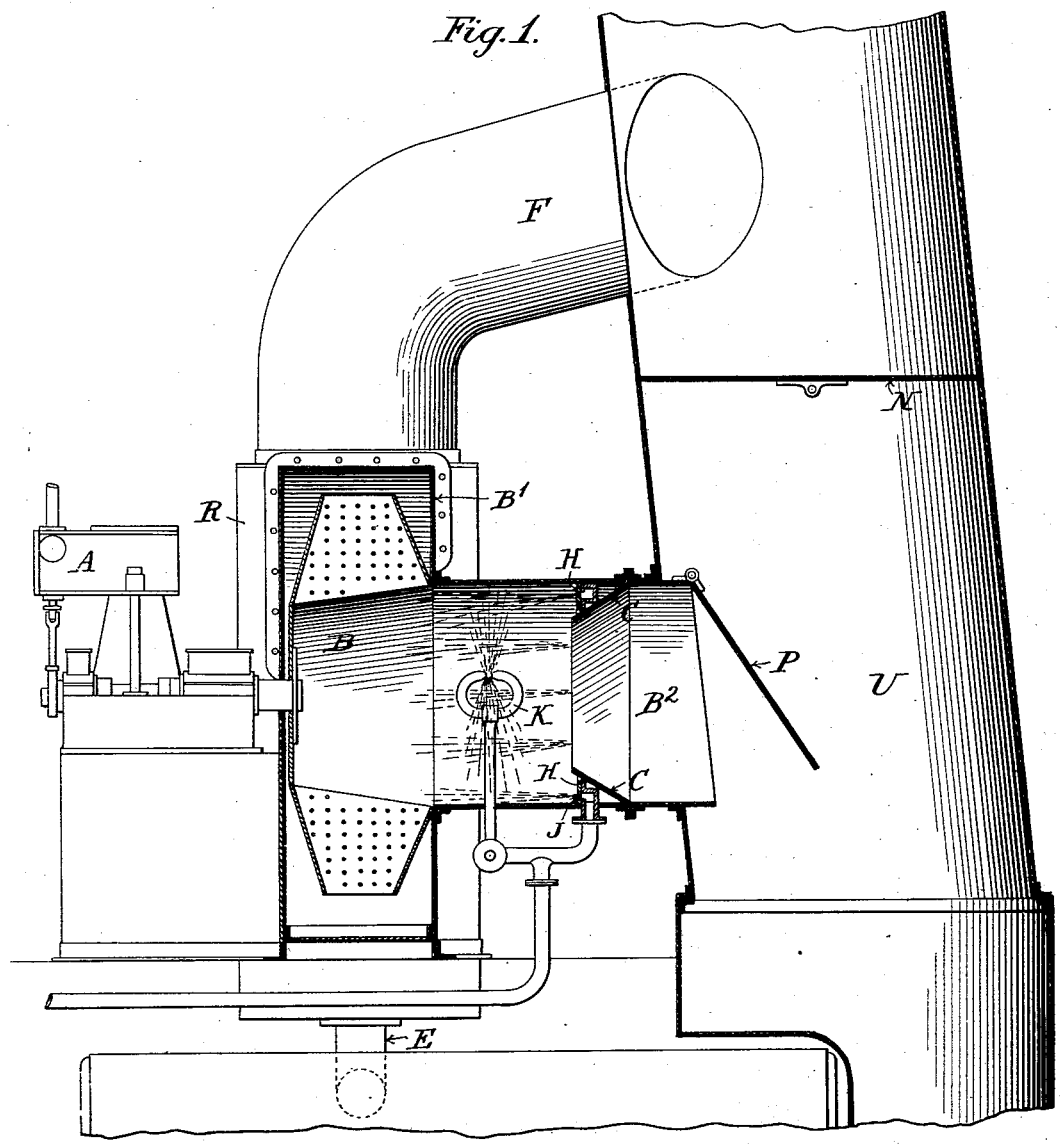

(No Model.)

J. PATTERSON.
APPARATUS FOR TREATING FIRE GASES.

No. 572,177. Patented Dec. 1, 1896.

(No Model.) 2 Sheets—Sheet 2.
J. PATTERSON.
APPARATUS FOR TREATING FIRE GASES.
No. 572,177. Patented Dec. 1, 1896.
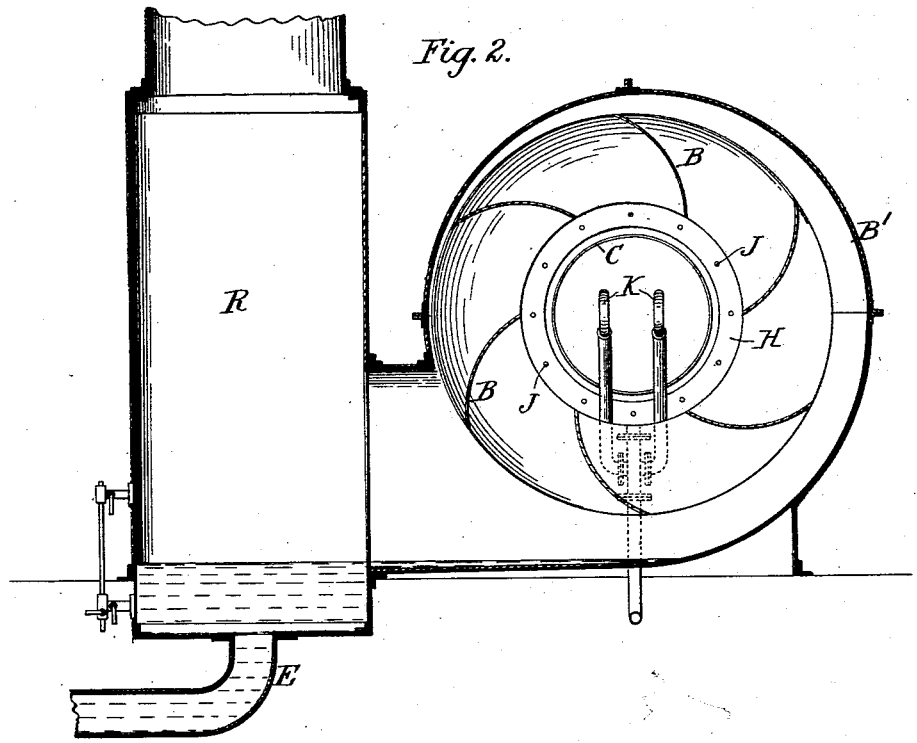
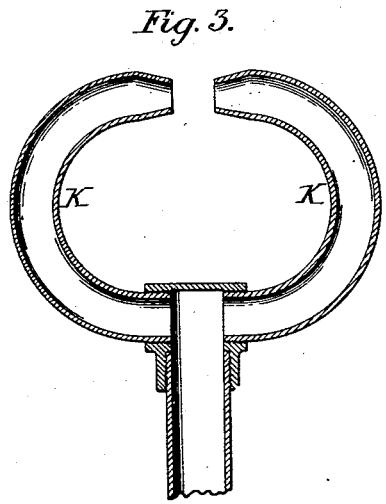
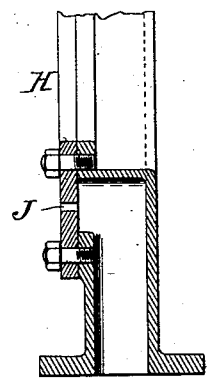

UNITED STATES PATENT OFFICE.

JAMES PATTERSON, OF GOUROCK, SCOTLAND, ASSIGNOR OF ONE-HALF TO JAMES RAMSAY SANDILANDS, OF GLASGOW, SCOTLAND.

APPARATUS FOR TREATING FIRE-GASES.

SPECIFICATION forming part of Letters Patent No. 572,177, dated December 1, 1896.

Application filed August 31, 1895. Serial No. 561,110. (No model.)

*To all whom it may concern:*

Be it known that I, JAMES PATTERSON, a subject of the Queen of Great Britain, residing at Gourock, in the county of Renfrew, Scotland, have invented new and useful Improvements in Apparatus for Treating the Fire-Gases Evolved in Steam-Boiler and other Furnaces, of which the following is a specification.

The present invention relates to improvements in apparatus for treating the gases evolved in steam-boiler and other furnaces in which a fan is employed, in combination with jets of water or other liquid, for the purpose of causing such gases to be intimately mixed with the water or other liquid and thereby condensed.

In order to reduce the volume of gases to be treated and consequently correspondingly reduce the power necessary to drive the fan in which such treatment takes place and also the size of the fan required, I cause a jet or jets of water or other suitable liquid to act upon such gases before the same enter the fan. I further employ an inducing nozzle or nozzles having an injecting action for the purpose of introducing the gases and also the water into the fan-casing.

The gases to be treated (either before or after having been subjected to the action of jets of water, as above described) pass through the center of the inducing nozzle or nozzles, while the water or other suitable liquid under pressure is introduced into an outer casing surrounding such center nozzle or nozzles, and both the gas and the water then pass into the fan-casing. The water passing through the outer casing of the nozzle or nozzles would have an inducing or injector action and assist the fan in drawing the gases into the fan-casing, the water and gases entering such casing together and being acted upon by the revolving vanes or blades of the fan, so as to produce an intimate commingling of the two and thus condensing or separating the solid particles of the gases and increasing the draft.

A suitable form of apparatus for carrying the invention into effect is illustrated in the accompanying drawings, in which—

Figure 1 is a longitudinal section of such apparatus; Fig. 2, a transverse section thereof. Fig. 3 is a vertical section of a suitable form of pipe or nozzle for delivering the jet or jets of water for condensing the gases before same enter the fan; and Fig. 4, a partial vertical section through the ring surrounding the inducing-nozzle, so as to produce an injecting action to assist in drawing the gases into the fan-casing. Figs. 3 and 4 are drawn to a larger scale than Figs. 1 and 2.

A is a motor, which may be of any suitable form, and which actuates the fan B in which the gases are to be treated. The casing B' of the fan B is connected by a suitable passage $B^2$ to the funnel, uptake, or flue U, through which the gases to be treated pass from the furnace or other source where they are generated.

The passage $B^2$ is preferably fitted with a damper P, so as to enable such passage to be opened or closed to a smaller or greater extent in order to regulate the draft, and the funnel or uptake U is also fitted with a damper N above the passage $B^2$, in order to be able to close this also to a smaller or greater extent, or entirely. The fan-casing B' is also connected with the funnel or uptake U by a passage F at a point above that where the damper N is situated, and through this passage F pass the gases after treatment in the fan B.

An inducing-nozzle C is situated in the passage $B^2$ leading to the fan-casing, and surrounding such nozzle is a ring H, having perforations J, through which water under pressure is caused to issue in the direction leading to the fan-casing. At any suitable distance in front of the inducing-nozzle C a pipe or pipes K is or are arranged, the same being preferably of the form shown in Fig. 3, so that water issuing from the opposed open mouths of such pipe or pipes will be converted into spray, so that the gases passing through same on their way to the fan B will become intimately mixed therewith and their volume consequently considerably diminished.

If desired, the positions of the inducing-nozzle C and the pipe or pipes K might be reversed.

The gases are drawn by the action of fan B (assisted by the injecting action of the nozzle C and the surrounding ring H when same are employed) through the passage B² into the fan-casing B', whereby they become charged with water from the jet or jets delivered from pipe K and also from the inducing-nozzle C, where same is employed. The gases thus charged with water are acted upon by the blades of fan B and absorb or condense smoke, dust, or solid particles from such gases. After such treatment the gases pass into a receiver R, in the bottom of which the water containing the impurities absorbed from the gases collects, and may be removed from time to time through the outlet E, while the purified gases pass upward from such receiver through the passage F and into the funnel or uptake U above the damper N, and so to the outlet.

What I claim as my invention, and desire to secure by Letters Patent, is—

1. The combination of a flue for smoke and gases, a fan-casing, a rotary fan in said casing, a passage connecting said flue and fan-casing, means for discharging jets of water into said connecting-passage transversely of the current of gases passing therethrough, and means for discharging inducing-jets across the transverse jets.

2. The combination of a fan, a flue or passage through which the gases to be treated pass, said flue being connected to said fan, means for supplying water to said fan, means for producing a jet or jets of water through which said gases pass, an inducing-nozzle disposed in the passage leading to the fan, and a perforated ring surrounding said nozzle through which water under pressure is caused to pass in the direction leading to the fan.

3. The combination of a fan, a flue or passage through which the gases to be treated pass, said flue being connected to said fan, means for producing a jet or jets of water through which said gases pass, an inducing-nozzle disposed in the passage leading to the fan, and jet devices disposed around said nozzle through which water under pressure is caused to pass in direction toward the fan.

JAMES PATTERSON.

Witnesses:
  GEO. T. SNEDDON,
  T. W. ALEXANDER.